United States Patent
Mason

(10) Patent No.: US 6,709,586 B2
(45) Date of Patent: Mar. 23, 2004

(54) DEWATERING METHOD AND DEVICE

(75) Inventor: J. Bradley Mason, Pasco, WA (US)

(73) Assignee: Studsvik, Inc., TN (US)

( * ) Notice: Subject to any disclaimer, the term of this patent is extended or adjusted under 35 U.S.C. 154(b) by 145 days.

(21) Appl. No.: 10/090,508

(22) Filed: Mar. 4, 2002

(65) Prior Publication Data

US 2003/0164342 A1 Sep. 4, 2003

(51) Int. Cl.[7] .................... B01D 35/12; B01D 35/30
(52) U.S. Cl. .............. 210/237; 210/323.2; 210/333.01; 210/411; 210/416.1; 210/798
(58) Field of Search ................ 210/232, 237, 210/323.2, 333.01, 359, 410, 411, 416.1, 798

(56) References Cited

U.S. PATENT DOCUMENTS

| | | | | |
|---|---|---|---|---|
| 656,908 A | * | 8/1900 | Taylor | 210/237 |
| 709,616 A | * | 9/1902 | Thorn | 210/237 |
| 748,088 A | * | 12/1903 | Moore | 210/237 |
| 956,366 A | * | 4/1910 | Knock | 210/237 |
| 1,404,667 A | * | 1/1922 | Steven | 210/237 |
| 2,354,623 A | * | 7/1944 | Tietig | 210/237 |
| 6,495,037 B1 | * | 12/2002 | Schuyler | 210/237 |

* cited by examiner

Primary Examiner—Robert Popovics
(74) Attorney, Agent, or Firm—Michael A. Mann; Sara A. Centioni; Nexsen Pruet Jacobs & Pollard, LLC

(57) ABSTRACT

A method and device for dewatering most liquid/solid solutions and slurries is described. A dewatering device having a dewatering pump in fluid communication with a filter rack with vertically arrayed filter elements that is carried by a container. To begin the dewatering process, the filter rack is lowered to the bottom of the container and the liquid/solid slurry is introduced. Next, the dewatering pump draws the liquid from the slurry into the filter rack and then to the pump. When dewatering efficiency decreases, the dewatering operation is momentarily stopped and the filter elements of the filter rack are backpulsed with air and raised to dislodge the filter cakes that have formed. The filter rack is then relowered and the dewatering operation continues. These steps of dewatering, backpulsing, raising the filter rack, and lowering filter rack are continued until the container is full of dewatered solids. Alternatively, the filter rack is affixed to the top of the container and the liquid/solid slurries are introduced until the container is mostly full. Next dewatering operations commence and continue until the container is full of dewatered solids.

18 Claims, 4 Drawing Sheets

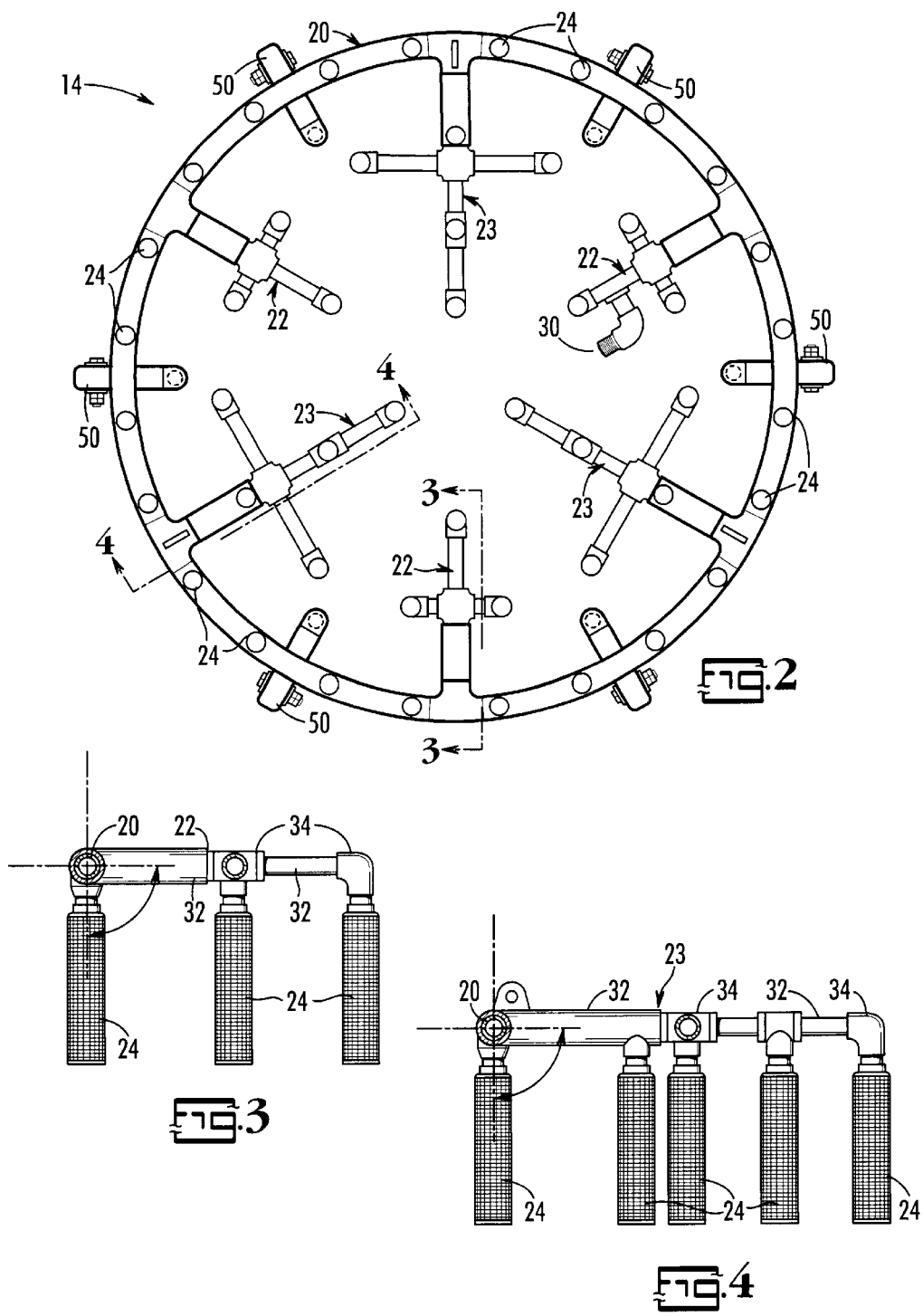

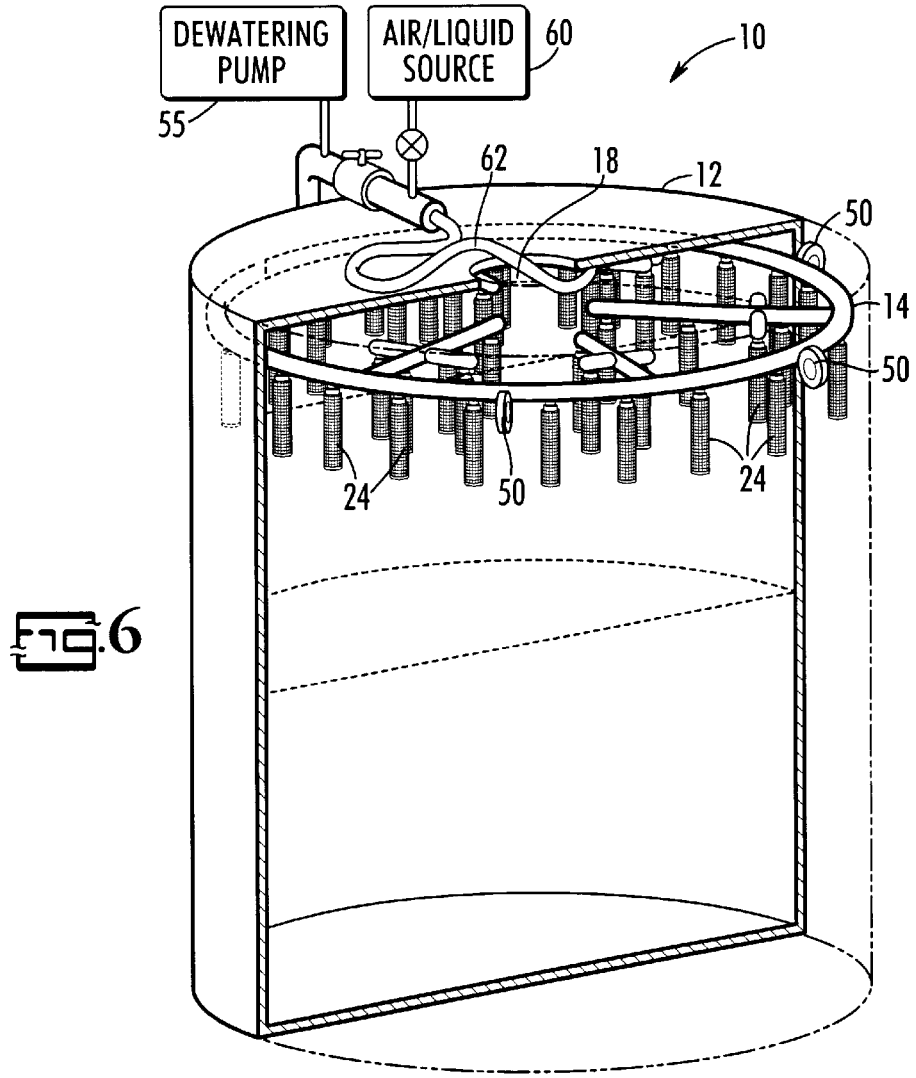

DEWATERING METHOD AND DEVICE

FIELD OF THE INVENTION

The present invention relates generally to dewatering methods and devices, and, in particular, to a method and device having removable filter elements for dewatering most liquid/solid solutions and slurries.

BACKGROUND OF THE INVENTION

The handling of hazardous wastes, such as radioactive wastes, generated by various industrial, medical, and electrical power generating activities is both a complex and troublesome undertaking considering the potentially devastating effects of exposure to such wastes. To limit the exposure of employees who process and handle this waste is of particular importance. It is also important to process these wastes so that they remain stable during their transport and disposal. For example, radioactive wastes need processing until the radionuclides present decay to nominal levels. Accordingly, various techniques and devices have been developed to effectively process wastes.

In the case of certain radioactive wastes, such as ion exchange media, slurry wastes and sludges, one processing technique is to dewater the slurries and sludges. In order to be acceptable for disposal, radioactive wastes must be dried to less than one-half percent water by volume of waste. It is known to dewater most liquid/solid solutions and slurries by introducing these slurries to containers having a variety of fixed filter elements such as filter sheets attached to the container floor and walls, and multiple filter elements secured into fixed piping headers or racks. These dewatering devices can typically be cleaned of filter cakes that form on the filter elements during the dewatering process by briefly reversing the direction of flow, or "back blowing," so that a partially cleaned or regenerated filter surface can restore the dewatering rates.

Previous dewatering devices took days or weeks to transfer and fully dewater waste slurries. Very fine or colloidal solids removed by powdered ion exchange resins may take 24 to 144 hours to transfer and dewater. Furthermore, typical filter backwash or backflush operations utilize such large quantities of air or liquids that the dewatered solids are agitated, partially refluidized, liquefied and remixed with the balance of the container contents. Even when the dewatering operations continue, there is still a substantial filter cake on the surface of the filter and the fines have been remixed with the rest of the container contents.

Therefore, there exists a need for a dewatering method and device that will more effectively and quickly transfer and dewater slurries, such as ion exchange resin slurries.

SUMMARY OF THE INVENTION

According to its major aspects and briefly stated, the present invention is generally a device and method for dewatering liquid/solid solutions and slurries. The dewatering device includes a removable filter rack and a lifting means. In particular, the device includes a container, a filter rack assembly, a filter rack lifting means, a dewatering or vacuum pump, and an air or water source for backpulsing or backflushing. These components cooperate to transfer and dewater waste slurries quickly and effectively.

The dewatering method includes the following steps: 1) lowering a filter rack to the bottom of a container; 2) slurrying wastes into the container; 3) vacuum pumping water from the slurried wastes; 4) stopping the dewatering operations when dewatering efficiency decreases from the initial rate and backpulsing the filter elements of the filter rack; 5) raising the filter rack off the bottom of the container and then optionally backpulsing the filter elements again. This process cycle of lowering filter rack, slurrying wastes, vacuum pumping, backpulsing/backflushing, raising the filter rack, and backpulsing again, is continued until the container is full of dewatered solids. Once the container is full of solids, the filter rack is removed for use in another container. Alternatively, the filter rack is left in the container and rests on top of the dewatered solids.

An alternative method of the present invention includes the following steps: 1) affixing the filter rack near the top of the container; 2) slurrying wastes into the container; 3) vacuum pumping water from the slurried wastes; 4) backpulsing the filter elements of the filter rack; 5) allowing the dewatered solids to slide down off the filter elements and settle by gravity to the bottom of the container; and 6) optionally backpulsing the filter elements. This process of slurrying wastes, vacuum pumping, backpulsing, allowing solids to settle, and backpulsing is continued until the container is full of dewatered solids. Once the container is full of solids, the filter rack is removed. Alternatively, the filter rack is left in the containers and rests on top of the dewatered solids.

A feature of the present invention is the use of backpulsing during the dewatering cycles. The backpulsing of a small volume and low pressure of air or water serves to break the filter free of the dewatered filter cake on the surface of the filter. Backpulsing at this small volume and low pressure does not mix or stir solids. Backpulsing also serves to optimize the dewatering efficiency. When the dewatering rate slows, dewatering is momentarily stopped and the filter rack is backpulsed. Thereafter, dewatering proceeds at a more efficient rate.

Another feature of the present invention is the use of the combined backpulsing and raising of the filter rack. The feature serves to effectively clean the filter elements while leaving all previously dewatered materials in a solids cake. As stated above, the backpulsing has such a small volume and pressure that no solids are mixed or stirred. Consequently, the dewatered solids remain in tact and also serve to scrape the surface of the filter elements as the latter are being lifted.

Yet another feature of the present invention is the use of the removable filter rack. Typical dewatering filters are fixed and may only be appropriate for one-time use. The filter rack of the present invention has the ability of being fully cleaned and reused. By moving the filter rack up during the dewatering cycles, the solids cakes are left at the bottom of the container and actually help to scrape the finer particles from the filter elements.

Still another important feature of the present invention is the use of the lifting mechanism. The lifting mechanism not only helps to fully clean the filter rack by lifting it, but also enables the filter rack to produce highly dewatered solids that completely fill the container with only one set of filter elements. By lifting and then relowering the rack during the dewatering cycles, the container eventually becomes full of the solids cakes that are dislodged from the filter elements.

Yet another important feature of the present invention is the arrangement of the filter elements on the filter rack. Because of particular symmetry and spacing, the filter element arrangement is designed so that the slurries are dewatered more effectively and evenly. Further, the orientation of the filter elements helps to more effectively clean the filter elements. As the rack is lifted, the vertically oriented filter elements are scraped by the solids cakes that are left behind.

Other features and their advantages will be apparent to those skilled in the art of dewatering devices and methods from a careful reading of the Detailed Description of the Preferred Embodiments accompanied by the following drawings.

BRIEF DESCRIPTION OF THE DRAWINGS

In the drawings,

FIG. 2 is a top view of a filter rack of a dewatering device, according to a preferred embodiment of the present invention;

FIG. 3 is a side detailed view of a small pipe branch of a filter rack of a dewatering device, according to a preferred embodiment of the present invention;

FIG. 4 is a side detailed view of a large pipe branch of a filter rack of a dewatering device, according to a preferred embodiment of the present invention;

FIG. 6 is a cross-sectional perspective view of a dewatering device having a fixed filter rack, according to a preferred embodiment of the present invention.

DETAILED DESCRIPTION OF PREFERRED EMBODIMENTS

Figure 1A:
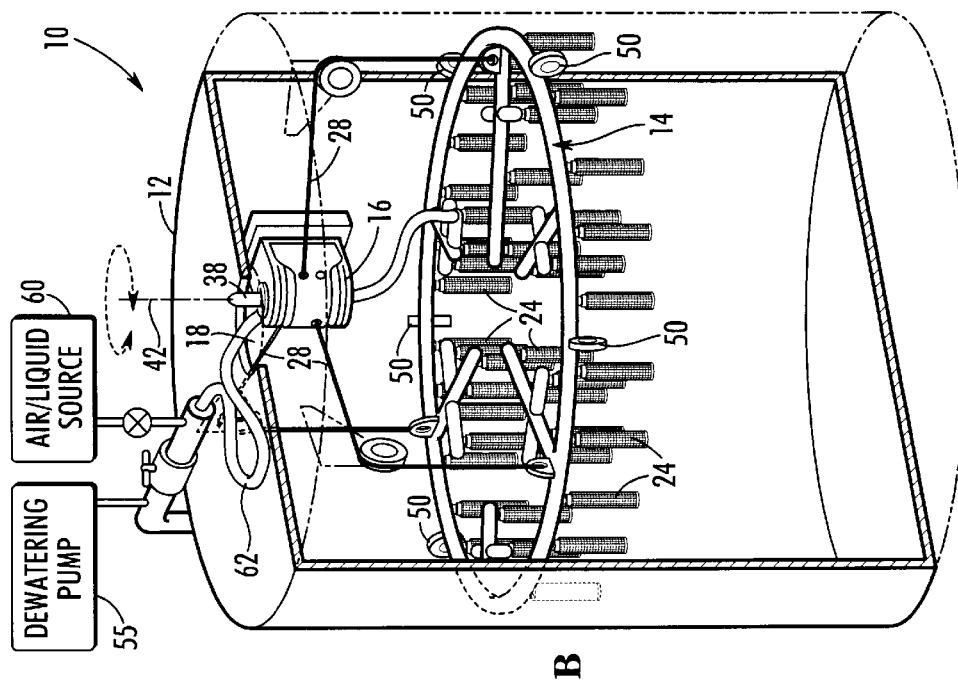
FIG. 1A is a cross-sectional perspective view of a dewatering device having a lowered filter rack, according to a preferred embodiment of the present invention.
Figure 1B:
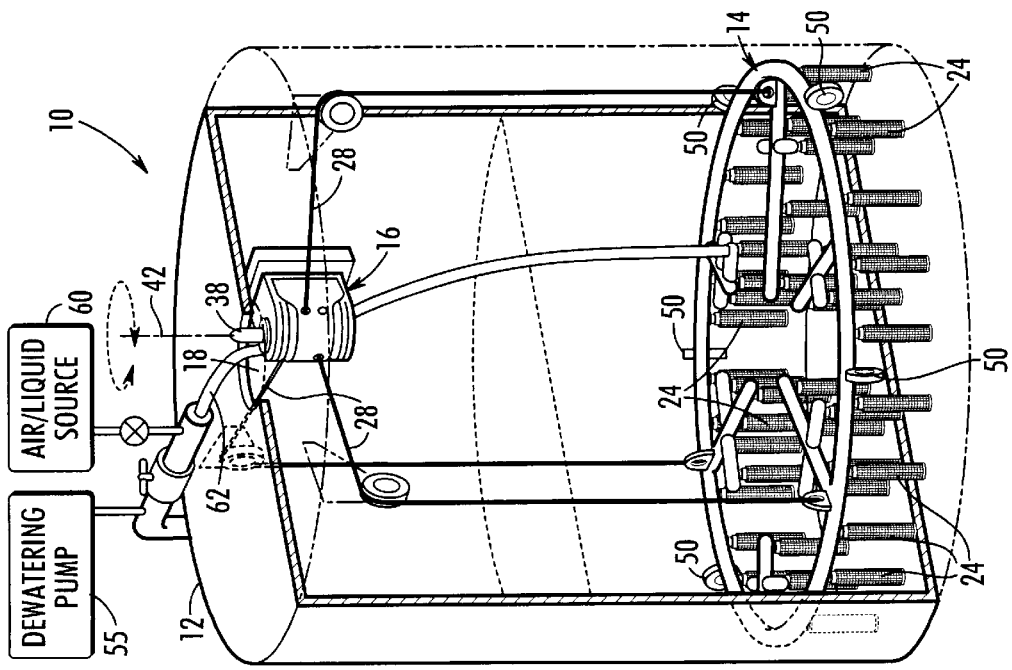
FIG. 1B is a cross-sectional perspective view of a dewatering device having a raised filter rack, according to a preferred embodiment of the present invention.

FIGS. 1A and 1B illustrate a preferred embodiment of the invention. FIG. 1A shows a perspective view of a movable dewatering device 10. Specifically, FIG. 1A shows the dewatering device in a lowered position and FIG. 1B shows the dewatering device in a raised position.

As shown, dewatering device 10 includes a container 12, a filter rack 14, a lifting mechanism 16, and a dewatering pump 55 external to container 12 that is connected to filter rack 14 by a pipe 62. These components cooperate to transfer and dewater waste slurries quickly and effectively. Filter rack 14 is connected to lifting mechanism 16 by cables 28 and is dimensioned to fit within container 12. Preferably, filter rack 14 extends along only a portion of container 12. Depending on the particular stage of the dewatering process, filter rack 14 is moved axially in container 12 according to the desired direction. To begin the dewatering process, filter rack 14 is lowered by reversing lifting mechanism 16 to the bottom of container 12 whereupon wastes are slurried into container 12. Wastes continue being slurried into container 12 until the height of filter rack 14 is covered. At this time the dewatering of the slurries commences by starting dewatering pump 55. Once the slurries have been dewatered, filter rack 14 is then raised by lifting mechanism 16 for cleaning and the process continues in layers from the bottom of container 12 to the top.

FIGS. 1A and 1B show container 12 as cylinder shaped; however, container 12 can be shaped into any shape as long as it has a uniform horizontal cross section. Preferably, container 12 is made of plastic or metal. Container 12 is provided with an opening 18 for receiving the top of lifting mechanism and for facilitating the filling and dewatering of the contents of container 12. Although FIG. 1A and 1B show that opening 18 of container 12 receives pipe 62 that is connected to dewatering and backpulsing connection 30, pipe 62 could alternatively pass through the side wall of container 12. Container 12 is preferably a container particularly suited for storage of radioactive materials.

Filter rack 14 is shown in further detail in FIGS. 2-4. As illustrated, the main structural component of filter rack 14 is a pipe header 20 that defines a plane. Along pipe header 20 are alternating small and large pipe branches 22, 23 (also shown in FIGS. 3 and 4, respectively) that extend from pipe header 20 and lie in the plane defined by pipe header 20. Preferably, small and large pipe branches 22, 23, are evenly spaced along pipe header 20. Pipe header 20 further includes filter elements 24, lifting lugs 26 with cables 28 attached, and a dewatering and backpulsing connection 30 that is in fluid communication through pipe 62 with dewatering pump 55 and an air and liquid source 60. To help guide filter rack 14 along the interior of container 12, filter rack 14 is further provided with wheels 50 that are affixed along the sides of pipe header 20. As discussed above, the arrangement of filter rack 14 is a particular feature of the present invention. The symmetry and spacing of pipe branches 22, 23, and filter elements 24 of filter rack 14 contribute to a more effective and evenly distributed dewatering process.

FIGS. 3 and 4 show side cross-sectional views of portions of filter rack 14. These figures illustrate the interconnection of pipe header 20 to smaller pipes 32 with multiple fittings 34. FIGS. 3 and 4 further illustrate side views of filter elements 24. Preferably, filter elements 24 are cylinder shaped and are connected to fittings 34 of filter rack 14. As the piping of filter rack 14 is all interconnected, and therefore in fluid communication, the dewatering operations affect each filter element 24 simultaneously. Accordingly, when dewatering pump 55 or vacuum source external to container 12 and attached to dewatering and backpulsing connection 30 by pipe 62 pulls a vacuum on filter rack 14, solids are collected on the exterior of each filter element 24. Similarly, when filter elements 24 need to be cleaned, a backflow or backpulse of air through dewatering and backpulsing connection 30 dislodges the formed solids cakes from each filter element 24 simultaneously. Solids "cakes" or filter "cakes" refers to a dense accumulation of dewatered solids around filter elements 24.

As further discussed above, the orientation of filter elements 24 is an important feature of the present invention. The figures illustrate (in particular FIGS. 3 and 4) that filter elements 24 are vertically oriented so that the major axes of filter elements 24 are perpendicular to the plane defined by pipe header 20 of filter rack 14. The particular orientation of filter elements 24 minimizes the disturbance of the solids cakes when filter rack 14 is raised. Additionally, the solids cakes help to scrape the remaining fine and colloidal material from filter elements 24 during the raising of filter rack 14.

Figure 5:
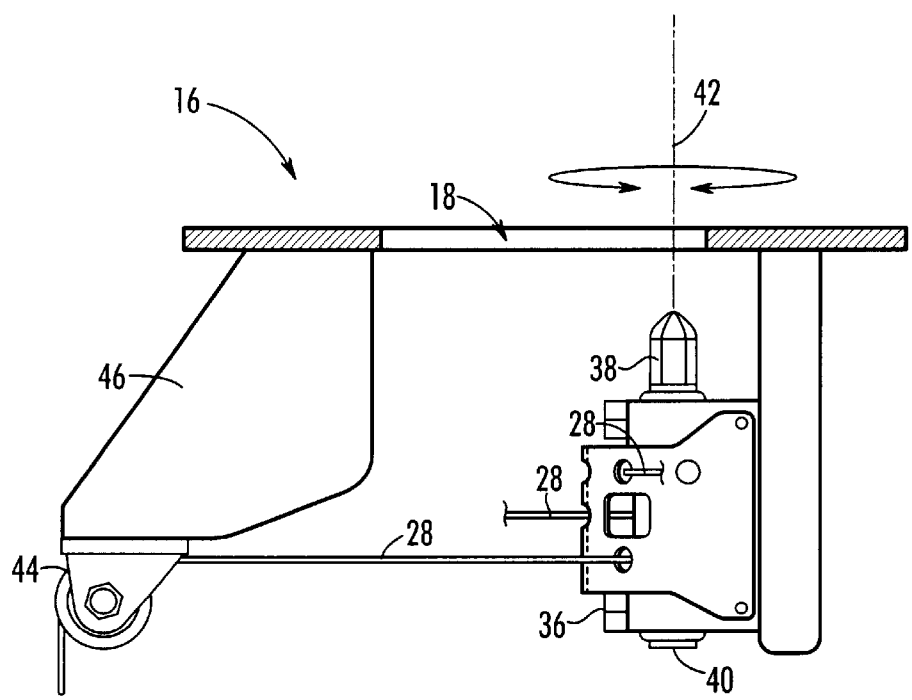
FIG. 5 is a side view of a lifting mechanism of a dewatering device, according to a preferred embodiment of the present invention.

Lifting mechanism 16 is shown in detail in FIG. 5. Preferably, lifting mechanism 16 includes a winch 36 that is affixed to container 12 and powered by a drive shaft 38. Winch 36 has a drum 40 around which are wound cables 28 attached to lifting lugs 26 of filter rack 14. Depending on the stage of the dewatering process filter rack 14 is moved axially in container 12 by turning winch 36 around a major axis 42 (shown in FIGS. 1A and 1B). If drum 40 of winch 36 is rotated in one direction around major axis 42, cables 28 are wound around drum 40 and filter rack 14 is raised. Similarly, if drum 40 is rotated in the opposite direction around main axis 42, cables become unwound and filter rack 14 is lowered. Although numerous cables may be used in connection with winch 36, the preferred embodiment includes three cables 28. As shown in FIG. 5, each of multiple cables 28 extends out from winch 36 and are perpendicular, or approximately perpendicular, to major axis 42 of winch 36 and are passed through a pulley 44.

Although FIGS. 1A, 1B, and 5 depict extension arms 46 to which pulley 44 is attached, extension arms 46 are optional. Alternatively, pulley 44 could be directly attached to the top of container 12. In this alternative embodiment, lifting mechanism 16 would be raised accordingly so that cables 28 extend out from winch 36 and are perpendicular, or approximately perpendicular, to major axis 42 of winch 36.

As discussed above, the dewatering process begins when filter rack 14 is lowered into container and wastes are slurried into container 12 until filter elements 24 of filter rack 14 are covered. Next, dewatering of the slurried wastes takes place by starting dewatering pump 55 or vacuum source external to container 12. Dewatering pump 55 pulls a vacuum on filter rack 14 and filter elements 24 drawing water from the slurry into the filter rack piping and then to dewatering pump 55 through pipe 62. This dewatering action removes liquids, concentrating the wastes into a dense, thickened sludge or solids cake. Alternatively, container 12 could be pressurized to push the water through filter elements 24.

As discussed above, the use of backpulsing is a particular feature of the present invention. Throughout the dewatering process, filter elements 24 of filter rack 14 are cleaned by means of reverse flow or backpulses of air or clean liquid through dewatering and backpulsing connection 30. The backpulsing helps to clean filter rack 14 and filter elements 24 so as to optimize the dewatering efficiency. Once the rate of liquid removal substantially decreases from the initial rate, the dewatering operation is momentarily stopped and filter rack 14 is backpulsed with a short burst of air or liquid to release the pressure differential across filter elements 24. This step results in essentially zero pressure differential across the filter and merely serves to break the vacuum and dislodge the solids cakes that have formed around filter elements 24 during the dewatering. The solids cakes retain their solid form and are not mixed or stirred. These cakes typically include fine particles, gels, colloidal materials, as well as other materials.

As further discussed above, the use of backpulsing in combination with lifting is also a particular feature of the present invention. Lifting mechanism 16 raises filter rack 14 off the bottom of container 12 up the full length of filter elements 24. Once filter rack 14 is raised, the settled and dewatered solids are left undisturbed and in place. Because the backpulse preceding the lifting has such a small volume and low pressure, the solids cakes are left intact. Depending on the type of waste that makes up the formed solids cakes, the exact volume and pressure required to dislodge the solids cakes may require experimentation by those skilled in the art. However, in the present invention preferred ranges for volume and pressure required to merely dislodge the solids cakes formed of such materials as fine particles, gels, colloidal materials are 1–2 cubic feet and 30–50 psig (pounds force of pressure per square inch gauge), respectively. The solids cakes thereafter scrape the sides of filter elements 24 as they are being raised. Consequently, the lifting of filter rack 14 actually helps clean filter elements 24.

Optionally, one or more backpulses by air and liquid source 60 can be done once filter rack 14 is raised to fully clean it and to start a new dewatering cycle. The dewatering, backpulsing, raising, and further backpulsing steps are continuously repeated until container 12 is full of dewatered solids. At this point, dewatering device 10 and dewatering pump 55 and air and liquid source 60 are disconnected. Filter rack 14 is thereafter removed and introduced into an empty container. Alternatively, filter rack 14 is just left in container 12 to rest on top of the dewatered solids.

FIG. 6 illustrates an alternative preferred embodiment of the present invention. As shown, filter rack 14 is affixed near the top of container 12. To initiate the dewatering process, wastes are slurried into container 12 until container 12 is approximately full. Next, dewatering of the slurried wastes takes place by starting dewatering pump 55 or vacuum source external to container 12. Dewatering pump 55 pulls a vacuum on filter rack 14 and filter elements 24 drawing water from the slurry into the filter rack 14 piping and then to dewatering pump 55. During dewatering, the solids accumulate and form a dense, dewatered cake on filter elements 24 that are initially backpulsed by air and liquid source 60. In this event, the solid filter cake is released as a large dewatered mass that is heavier than the surrounding solution or slurry on the bottom of the container. The dewatered solids then slide down off filter elements 24 and settle by gravity to the bottom of container 12 leaving clean filter elements 24. As discussed above, filter elements 24 are vertically oriented so that the major axes of filter elements 24 are perpendicular to the plane defined by pipe header 20 of filter rack 14. The particular orientation of filter elements 24 minimizes the disturbance of the solids cakes when they slide down filter elements 24. Additionally, the solids cakes may help to scrape the remaining fine and colloidal material from filter elements 24 as the cakes are sliding off filter elements 24. Filter elements 24 are then backflushed a final time and the dewatering operation is continued until container 12 is full of dewatered solids. Once container 12 is filled, filter rack 14 is optionally removed and introduced into another container to begin a new dewatering process. Alternatively, filter rack 14 is just left in container 12 to rest on top of the dewatered solids.

It will be apparent to those skilled in the art that many changes and substitutions can be made to the preferred embodiment herein described without departing from the spirit and scope of the present invention as defied by the appended claims.

What is claimed is:

1. A device for dewatering wastes, comprising:
    a container having an opening;
    a filter rack having cylindrical filter elements carried thereon and that is carried within said container, said filter rack extending along only a portion of the height of said container;
    means contained within and affixed to said container for moving said filter rack; and
    a dewatering pump external to said container and that is in fluid communication to said filter rack.

2. The device as recited in claim 1, wherein said filter rack is attached to the top of said container.

3. The device as recited in claim 1, wherein said filter rack has a dewatering connection and said device further comprises a pipe, said pipe connecting said dewatering pump to said filter rack via said dewatering connection, said pipe passing through said opening of said container.

4. The device as recited in claim 1, wherein said filter rack has a dewatering connection and said device further comprises a pipe, said pipe connecting said dewatering pump to said filter rack via said dewatering connection, said pipe passing through the wall of said container.

5. The device as recited in claim 1, wherein said moving means is a winch having cables that are attached to said filter rack.

6. The device as recited in claim 5, wherein said filter rack includes lifting lugs to which said cables of said winch are attached.

7. The device as recited in claim 1, wherein said filter rack further includes:
   a pipe header defining a plane; and
   pipe branches extending from said pipe header.

8. The device as recited in claim 7, wherein said cylindrical filter elements are connected to said pipe header and said pipe branches, and wherein said cylindrical filter elements, said pipe header, and said pipe branches are in fluid communication with said dewatering pump.

9. The device as recited in claim 8, wherein said filter elements have axes, and wherein said cylindrical filter elements are vertically oriented so that said axes of said cylindrical filter elements are perpendicular to said plane defined by said pipe header.

10. A device for dewatering wastes, comprising:
    a container having an opening;
    a filter rack carried within said container said filter rack having cylindrical filter elements carried thereon;
    means contained within and attached to said container for moving said filter rack; and
    a dewatering pump external to said container and that is in fluid communication to said filter rack.

11. The device as recited in claim 10, wherein said filter rack has a dewatering connection and said device further comprises a pipe, said pipe connecting said dewatering pump to said filter rack via said dewatering connection, said pipe passing through said opening of said container.

12. The device as recited in claim 10, wherein said filter rack has a dewatering connection and said device further comprises a pipe, said pipe connecting said dewatering pump to said filter rack via said dewatering connection, said pipe passing through the wall of said container.

13. The device as recited in claim 10, wherein said moving means is a winch having cables that are attached to said filter rack.

14. The device as recited in claim 13, wherein said filter rack includes lifting lugs to which said cables of said winch are attached.

15. The device as recited in claim 10, wherein said filter rack includes:
    a pipe header defining a plane; and
    pipe branches spaced evenly along said pipe header and that extend from said pipe header, wherein said cylindrical filter elements are connected to said pipe header and said pipe branches.

16. The device as recited in claim 15, wherein said pipe header, said pipe branches, and said cylindrical filter elements are in fluid communication with said dewatering pump.

17. The device as recited in claim 16, wherein said cylindrical filter elements have axes, and wherein said filter elements are vertically oriented so that said axes of said filter elements are perpendicular to said plane defined by said pipe header.

18. The device as recited in claim 15, wherein said pipe header of said filter rack has attached wheels that guide said pipe header as it is being moved in said container, and wherein said pipe header, said pipe branches, and said cylindrical filter elements are moved axially in said container by said moving means.

* * * * *